(12) United States Patent
Gruber et al.

(10) Patent No.: US 7,708,539 B2
(45) Date of Patent: May 4, 2010

(54) DEVICE FOR CALIBRATING AN EXTRUDED PLASTIC PROFILE

(75) Inventors: Dietmar Gruber, Schlierbach (AT); Erwin Krumböck, Ansfelden (AT)

(73) Assignee: Gruber & Co Group GmbH, Pettenbach (AT)

( * ) Notice: Subject to any disclaimer, the term of this patent is extended or adjusted under 35 U.S.C. 154(b) by 406 days.

(21) Appl. No.: 11/792,660

(22) PCT Filed: Dec. 9, 2005

(86) PCT No.: PCT/AT2005/000496

§ 371 (c)(1),
(2), (4) Date: Jun. 26, 2007

(87) PCT Pub. No.: WO2006/060837

PCT Pub. Date: Jun. 15, 2006

(65) Prior Publication Data

US 2008/0118593 A1    May 22, 2008

(30) Foreign Application Priority Data

Dec. 10, 2004   (AT) .............................. A 2078/2004

(51) Int. Cl.
*B29C 47/90* (2006.01)
(52) U.S. Cl. ..................... 425/71; 425/186; 425/192 R; 425/326.1; 425/384; 425/388
(58) Field of Classification Search ............. 425/71, 425/186, 192 R, 326.1, 384, 388
See application file for complete search history.

(56) References Cited

U.S. PATENT DOCUMENTS 5,288,218 A    2/1994   Melkonian 5,316,459 A *  5/1994   Melkonian et al. ............ 425/71
6,200,119 B1 * 3/2001   Pelto et al. ..................... 425/71

(Continued)

FOREIGN PATENT DOCUMENTS

AT           006 791 U1       4/2004

(Continued)

OTHER PUBLICATIONS

International Search Report.

*Primary Examiner*—Robert B Davis
*Assistant Examiner*—Joseph Leyson
(74) *Attorney, Agent, or Firm*—Collard & Roe, P.C.

(57) ABSTRACT

A device is suggested for calibrating an extruded plastic profile (1) having a shaping extrusion die (3) and having a framework (6) which is displaceable in the longitudinal direction of the plastic profile (1) in relation to the extrusion die (3), which has a cooling tank (5) and, between the cooling tank (5) and the extrusion die (3), a dry calibration apparatus (4) which is replaceably attached to a carrier (12) and is connectable on one hand to supply lines for a coolant liquid feed and removal and on the other hand to a partial vacuum. To obtain advantageous mounting conditions, it is suggested that the carrier (12), which is adjustable in relation to the cooling tank (5) in the longitudinal direction of the plastic profile (1), form a distributor, connected to the supply lines (16, 17), having line transitions (25) for the coolant liquid and the partial vacuum in the placement area of the dry calibration apparatus (4), which is provided with corresponding line transitions.

12 Claims, 5 Drawing Sheets

U.S. PATENT DOCUMENTS

| | | |
|---|---|---|
| 6,296,464 B1 | 10/2001 | Pürstinger |
| 6,702,560 B2 * | 3/2004 | Zhang et al. .................. 425/71 |
| 2004/0217509 A1 * | 11/2004 | Hartley et al. ............... 264/151 |
| 2005/0120771 A1 * | 6/2005 | Hofmann et al. ............. 73/1.01 |
| 2006/0157887 A1 * | 7/2006 | Schwaiger ............... 264/210.2 |

FOREIGN PATENT DOCUMENTS

| | | |
|---|---|---|
| DE | 197 45 843 A1 | 4/1998 |
| DE | 298 03 298 U1 | 6/1998 |
| DE | 199 17 837 A1 | 10/1999 |
| EP | 0 950 498 A1 | 10/1999 |
| EP | 0 999 034 A2 | 5/2000 |

* cited by examiner

DEVICE FOR CALIBRATING AN EXTRUDED PLASTIC PROFILE

CROSS REFERENCE TO RELATED APPLICATIONS

Applicants claim priority under 35 U.S.C. §119 of Austrian Application No. A 2078/2004 filed Dec. 10, 2004. Applicants also claim priority under 35 U.S.C. §365 of PCT/AT2005/0000496 filed Dec. 9, 2005. The international application under PCT article 21(2) was not published in English.

FIELD OF THE INVENTION

The present invention relates to a device for calibrating an extruded plastic profile having a shaping extrusion die and having a framework displaceable in the longitudinal direction of the plastic profile in relation to the extrusion die, which has a cooling tank and, between the cooling tank and the extrusion die, a dry calibration apparatus which is replaceably attached to a carrier and is connectable on one hand to supply lines for coolant liquid feed and removal and on the other hand to a partial vacuum.

DESCRIPTION OF THE PRIOR ART

Typical extrusion facilities for producing plastic profiles have an extruder having a shaping extrusion die and a calibrating table (DE 199 17 837 A1), which comprises a framework displaceable in the longitudinal direction of the plastic profile in relation to the extrusion die, which carries a cooling tank having calibrating screens and a dry calibration apparatus between the cooling tank and the extrusion die. This dry calibration apparatus is composed of multiple calibration units, which form multiple slots situated at a mutual distance in the longitudinal direction of the plastic profile, each running along a profile circumference and able to be impinged with partial vacuum, to suction the walls of the plastic profile, which is provided with cavities, outward against the calibration surfaces of the calibration units. Because the calibration units must additionally be cooled in the area of the calibration surfaces, not only are multiple feed and drain lines to be provided for the cooling liquid, but rather also supply lines for impinging the slots with partial vacuum, which causes significant mounting effort during the installation of the dry calibration apparatus, which is repeated in the event of possibly required reworking of the calibration units and upon each change of the calibration units to change over to another profile shape. In addition, when the calibration units are changed, a new orientation in relation to the shaping extrusion die is necessary, which must be performed by adjusting the calibration table vertically and to the side.

SUMMARY OF THE INVENTION

The present invention is thus based on the object of implementing a calibration device of the type described at the beginning in such a way that the installation effort necessary for changing the calibration units and the mechanical adjustment work may be significantly reduced.

The present invention achieves the stated object in that the carrier, which is adjustable in the longitudinal direction of the plastic profile in relation to the cooling tank, forms a distributor, connected to the supply lines, having line transitions for the coolant liquid and the partial vacuum in the placement area of the dry calibration apparatus, which is provided with corresponding line transitions.

Because, as a result of these measures, the carrier represents a distributor for the coolant liquid and the partial vacuum, the dry calibration apparatus solely has to be connected in a predefined position to the carrier to connect the dry calibration apparatus to a coolant liquid loop and/or to connect it to a partial vacuum source. The line transitions of the carrier on one hand and the dry calibration apparatus on the other hand, which correspond to one another, ensure error-free line connection. To be able to take different overall lengths of the dry calibration apparatus into consideration upon changeover of the calibration device to another profile shape, the cooling tank is adjustable in relation to the carrier in the longitudinal direction of the plastic profile. This adjustability also eases the accessibility to the dry calibration apparatus.

Especially advantageous construction conditions result if the carrier has a main body attachable to the supply lines and a replaceable distributor plate, receiving the dry calibration apparatus and forming line transitions, which has a flow connection to the main body via passages for the coolant liquid feed and removal and to the partial vacuum. Because of this division into a main body and a replaceable distributor plate, the dry calibration apparatus used may be pre-mounted on a distributor plate, to then be placed with the distributor plate on the main body as a module, which significantly decreases the mounting effort. In addition, different distributor plates tailored to the particular dry calibration apparatus used may be employed if it is ensured that the flow connection between the main body and the distributor plate for the coolant liquid feed and removal and for the partial vacuum is secured upon attachment of the distributor plate to the main body.

Dry calibration apparatuses are generally axially composed of multiple calibration units. In regard to the carrier use as the distributor, this means that the individual calibration units are to be connected to the supply lines for the coolant liquid and the partial vacuum, independently of their number, in such a way that unneeded line transitions of the distributor plate are blocked. For this purpose, the main body may have axial distributor channels at least for the coolant liquid feed and the partial vacuum, which are subdivided, in accordance with the axial division of the dry calibration apparatus into individual calibration units, into separate flow sections having overflow channels open to the distributor plate, so that with the aid of the distributor plate, the associated overflow channels may be connected or terminated, depending on whether the distributor plate forms a terminus or a connection line for these overflow channels. The continuing distributor channel associated with an overflow channel is blocked when an overflow channel is terminated. Therefore, no additional measures are needed to ensure the particular required supply of the dry calibration apparatus with coolant liquid and/or with partial vacuum.

The suction slots of the dry calibration apparatus are particularly to be implemented having a comparatively small width in the intake area of the dry calibration apparatus, to suppress a suction of the not yet solidified outer walls of the plastic profile into the suction slots. To ensure sufficient partial vacuum impingement of the plastic profile via the suction slots in spite of this restricted width of the suction slots, the distributor plate may have a recess, extending in the axial direction over multiple suction slots and connected to a distributor channel for the partial vacuum, in the placement area of the particular calibration units, which allows good penetration of the partial vacuum at the suction slots. In addition, external partial vacuum lines may be connected to the distributor plate, to also achieve an advantageous partial vacuum impingement on the side of the calibration units facing away from the carrier.

To optimize the calibration of the plastic profile, the cooling conditions and the partial vacuum conditions are to be adapted to the particular requirements within the dry calibration apparatus, which is performed with the aid of corresponding control units. Particularly advantageous conditions may be achieved with the aid of the carrier for the dry calibration apparatus, used according to the present invention as the distributor for the coolant liquid and the partial vacuum, if the carrier has control units for the coolant liquid flow and/or the partial vacuum, because in this case the settings performed are maintained when the dry calibration apparatus is removed. Although different control units may be used, particularly simple construction conditions result if the control units comprise a control bolt inserted in a hole so it is adjustable by screwing, which has a flattened part in the area of a flow channel intersecting the hole for the control bolt. Depending on the rotational position of the control bolt, the flattened part of the control bolt closes or opens the flow channel running transversely to the control bolt more or less, so that continuous control of the flow passage is made possible by the rotational adjustment. The axial displacement of the control bolt is not necessary, but the screw adjustment offers simple handling with sufficient securing of the particular rotational position.

A further possibility of a simple constructive solution for the control unit is that the control bolt adjustable by screwing is situated in an extension of a flow channel discharging into another flow channel opposite its discharge. A change of the throttle gap between the front face of the control bolt and the discharge opening results due to the axial adjustment of the control bolt opposite to the discharge opening of the coaxial flow channel, which results in a corresponding influence on the flow conditions.

In the event of a small distance between the dry calibration apparatus and the cooling tank, the good partial vacuum impingement of the dry calibration apparatus results in the danger that because of the higher partial vacuum in the area of the dry cooling apparatus, coolant liquid will be suctioned out of the tank into the dry calibration apparatus, which may result in gloss marks in the surface area of the plastic profile in certain circumstances. To avoid such gloss marks, the distributor plate may have a ventilated connection for a peripheral slot provided in the area of the end of the dry calibration apparatus facing toward the cooling tank and open to the plastic profile, so that only air may be suctioned out of the ventilated peripheral slot via the partial vacuum of the calibration apparatus. If the dry calibration apparatus is additionally sealed in relation to the cooling tank, the possible air intake is restricted both in regard to the dry calibration apparatus and also in regard to the cooling tank to the air from the ventilated peripheral slot, which provides advantageous conditions in regard to the partial vacuum buildup.

As already noted, the cooling tank is to be mounted adjustably in relation to the carrier in the longitudinal direction of the plastic profile. For this purpose, the carrier may form a longitudinal guide for the cooling tank, with the advantage that the cooling tank is oriented directly in relation the carrier, which makes additional adjustment work superfluous. This longitudinal guide is advantageously provided on the main body of the carrier extended over the distributor plate toward the cooling tank, so as not to impair the change of the dry calibration apparatus. For the orientation of the dry calibration apparatus in relation to the extrusion die, the die may comprise a centering guide for the carrier of the dry calibration apparatus.

BRIEF DESCRIPTION OF THE DRAWING

The object of the present invention is illustrated as an example in the drawing.

DESCRIPTION OF THE PREFERRED EMBODIMENT

Figure 1:
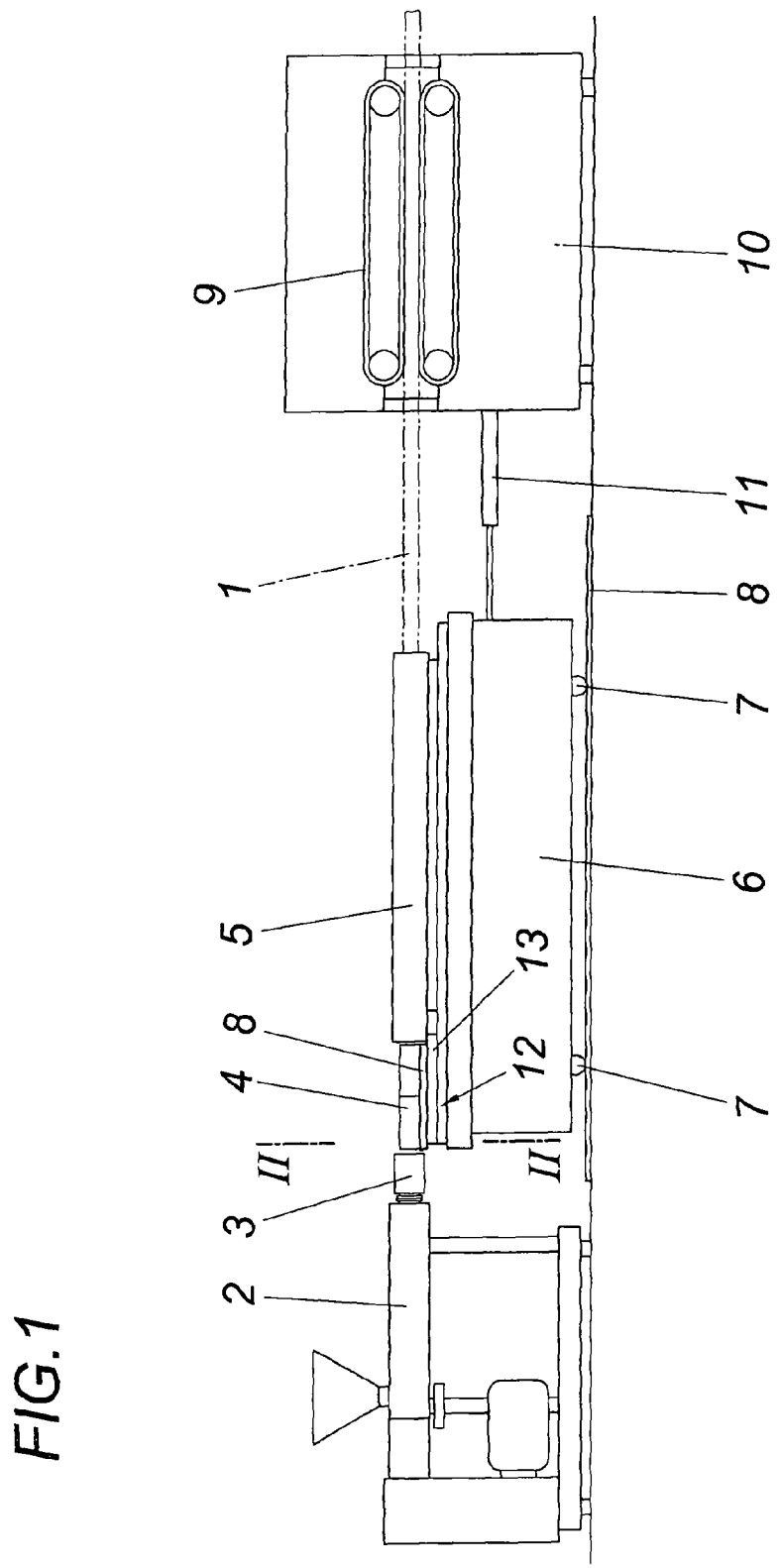
FIG. 1 shows a device according to the present invention for extruding a plastic profile in a schematic side view.

According to FIG. 1, the device for calibrating an extruded plastic profile 1 has a shaping extrusion die 3 placed on an extruder 2, from which a dry calibration apparatus 4 and the cooling tank 5 are situated downstream. The dry calibration apparatus 4 and the cooling tank 5 are mounted on a framework 6 forming a calibration table, which may be moved with the aid of rolls 7 on rails 8 in the longitudinal direction of the plastic profile 1. A drawing-off conveyor 9 in the form of a chain conveyor is used for drawing off the plastic profile 1. A positioning cylinder 11 for moving the framework 6 is provided between the fixed framework 10 of the drawing-off conveyor 9 and the framework 6.

In contrast to typical calibration devices, the carrier 12 for the dry calibration apparatus 4 is implemented as a distributor for the cooling liquid on one hand and the partial vacuum on the other hand. As may be seen from FIGS. 2 through 4, the carrier 12 has a main body 13 connected to the framework 6 having axial distributor channels 14, 15 running in the longitudinal direction of the plastic profile 1, which are connected to supply lines 16 and 17 for the coolant water feed and the partial vacuum, respectively. A distributor plate 18 is placed on this main body 13, which carries the dry calibration apparatus 4 and produces the flow connection for the coolant liquid and the partial vacuum between the main body 13 and the dry calibration apparatus 4. For this purpose, junction channels 19, 20 originating from the distributor channels 14, 15 are provided in the main body 13, from which connection channels 21, 22 originate, which form passages for the coolant liquid and/or the partial vacuum with channels 23, 24 of the distributor plate 18. The channels 23 and 24 form, possibly after a further branch, line transitions 25 for the dry calibration apparatus 4, so that when the dry calibration apparatus 4 is placed on the distributor plate 18, the supply connections of the dry calibration apparatus 4 for the coolant liquid and the partial vacuum are produced, because the line transitions 25 of the distributor plate 18 correspond to the appropriate line transitions of the dry calibration apparatus 4. To make the impingement of the suction slots of the calibration apparatus with partial vacuum generous, the line transitions are formed in the area of the partial vacuum supply by openings 26, which extend over multiple suction slots in the longitudinal direction of the plastic profile 1, so that the suction connections for the suction slots discharge into these openings 26.

Figure 3:
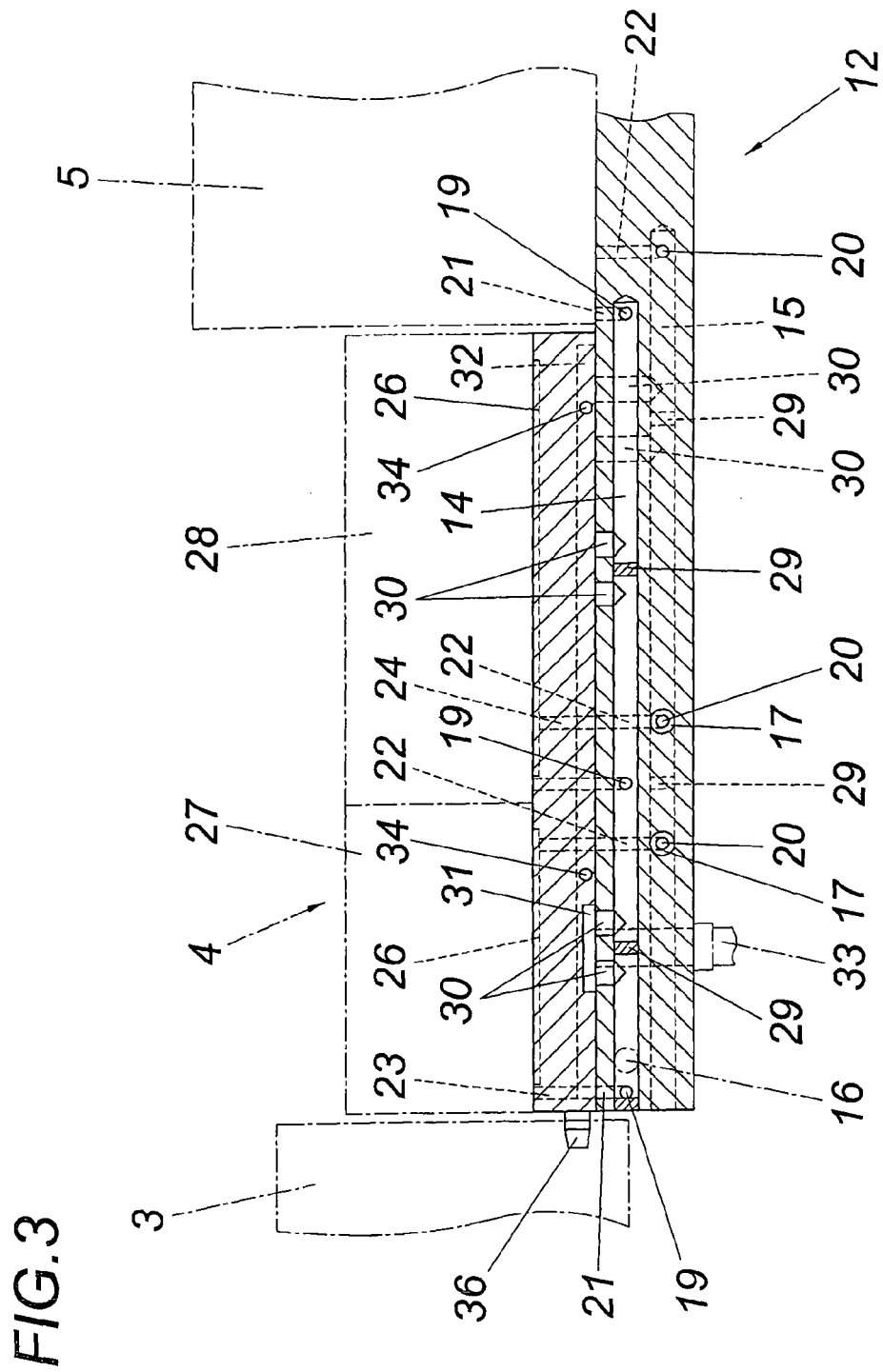
FIG. 3 shows a section along line III-III of FIG. 1 in a smaller scale.

The dry calibration apparatuses 4 are typically composed of multiple calibration units 27, 28 in the axial direction. Because the main body 13 is shared for the particular calibration units 27, 28 used, the particular adaptation to the calibration units 27, 28 must occur via the distributor plate 18. Because of the different lengths of the dry calibration apparatus 4 composed of the particular calibration units 27, 28, in addition, the unneeded connection channels 21, 28 are to be terminated. For this purpose, the axial distributor channels 14, 15 are subdivided by partition walls 29 in accordance with the division of the dry calibration apparatus 4 into calibration units 27, 28 and have overflow channels 30 which are open toward the distributor plate 18, as shown in FIG. 3. These overflow channels 30 are either connected to one another by connection lines 31 of the distributor plate 18 or terminated by the distributor plate 18, so that, as shown in FIG. 3, for example, the coolant liquid which is introduced into the distributor channel 14 via the coolant liquid feed 16 may flow over the partition wall 29 following in the passage direction of the plastic profile 1 into the next section, but not from this section over the further partition wall 29 into the next section after that, because the distributor plate 18 itself terminates the overflow channels 30 in the area of the second partition wall 29. The connection channels 21 discharging outside the connection plate 18 are therefore cut off from the coolant liquid feed. However, in the exemplary embodiment, the intake-side calibration unit 27 is impinged by a higher partial vacuum, so that the distributor line 15 for the partial vacuum is impinged by different partial vacuums via two separate supply lines 17. The partition wall 29 between the two supply lines 17 may therefore not have flow around it. This is only true of the following partition wall 29, which has corresponding overflow channels 30 situated up and downstream.

Figure 2:
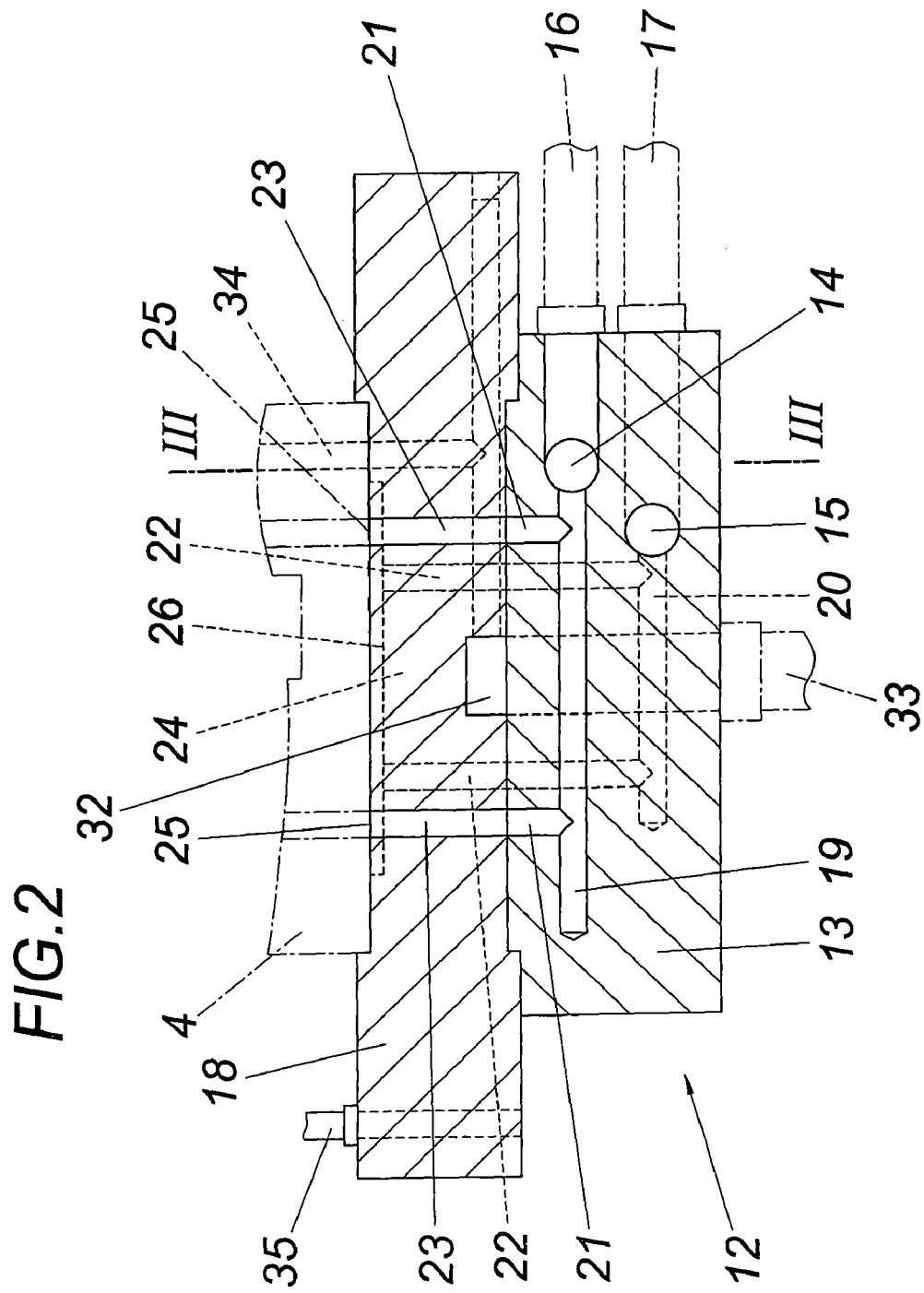
FIG. 2 shows this device in the area of the dry calibration apparatus in a section along line II-II of FIG. 1 in a larger scale.

The heated coolant liquid is collected in a drain channel 32 of the distributor plate 18 and flows via a passage channel of the main body 13 into a liquid drain 33. A return line 34 of the dry calibration apparatus 4, which is connected to the drain channel 32 via the distributor plate 18, as indicated in FIG. 2. To be able to check the drain of the coolant liquid by a visual check, the corresponding return lines of the dry calibration apparatus 4 may be connected via a hose 35 to a passage opening of the distributor plate 18, through which the coolant liquid flows freely into a collection trough. If the through hole connected to the hose 35 is connected to the drain channel 32 of the distributor plate 18, the hose 35 may be implemented as transparent, to also be able to establish the proper return flow of the heated coolant liquid. Of course, it is also possible to guide a return line 34 through the distributor plate 18 to a through hole discharging above a collection trough.

Because of the division of the carrier 12 into a main body 13, attached to the framework 6, which is connected to the supply lines 16, 17, and a distributor plate 18 connectable to the main body 13, the advantageous possibility is provided of pre-mounting the particular dry calibration apparatus 4 required on a corresponding distributor plate 18, to place the distributor plate 18 having the mounted dry calibration unit 4 as a module on the main body 13. Because the dry calibration apparatuses 4 may have different lengths and are to extend close to the cooling tank 5, the cooling tank 5 is to be adjusted in relation to the carrier 12 for the dry calibration apparatus 4 in the longitudinal direction of the plastic profile 1. For this purpose, the carrier 12 may be mounted displaceably on the framework 6. However, in regard to the required displacement of the framework 6 in relation to the extrusion die 3, for example, when the facility is started up, it is recommended that the carrier 12 be rigidly connected to the framework 6, so that the framework 6 may be moved toward the extrusion die 3 until it stops. The mutual orientation between the extrusion die 3 and the dry calibration apparatus 4 is performed easily via a centering guide of the extrusion die 3, in which the centering pins 36 of the distributor plate 18 engage, as indicated in FIG. 3.

The rigid mounting of the carrier 12 on the framework 6 requires a displacement of the cooling tank 5 on the framework 6. To ensure a predefined orientation of the cooling tank 5 in relation to the dry calibration unit 4, the cooling tank 5 may have lateral guide strips 37 corresponding to FIG. 4, which work together with longitudinal guides 38 of the main body 13.

Figure 4:
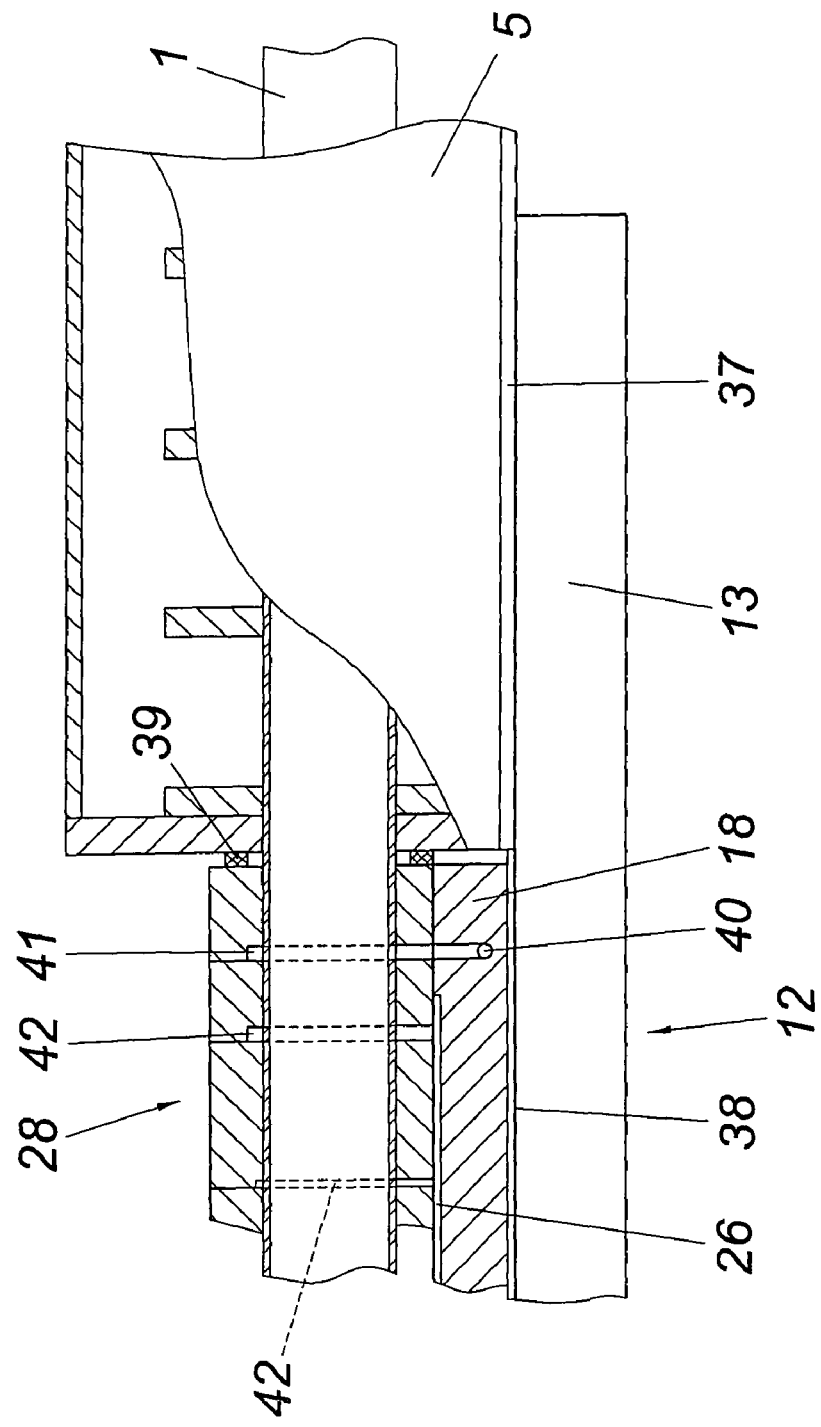
FIG. 4 shows the device in a longitudinal section in detail in the transition area from the dry calibration apparatus to the cooling tank in a larger scale.

According to FIG. 4, the outlet-side calibration unit 28 of the dry calibration apparatus 4 is attached via a seal 39 to the cooling tank 5 to avoid the suctioning of incorrect air into the cooling tank 5 on one hand and into the dry calibration apparatus 4 on the other hand as a result of the partial vacuum impingement of both the dry calibration apparatus 4 and also the cooling tank 5. An extensive air terminus in the transition area from the dry calibration apparatus 4 to the cooling tank 5 opens up the danger, however, that the higher partial vacuum in the area of the dry calibration apparatus 4 will penetrate through to the cooling tank 5 with the result that coolant liquid is suctioned from the cooling tank 5 through the passage of the plastic profile 1 in the front wall of the cooling tank 5 into the calibration unit 28, which may result in impairment of the surface of the plastic profile 1. In order to easily suppress such a flow penetration, the distributor plate 18 has a ventilated attachment 40 for an outlet-side peripheral slot 41 which is open in relation to the plastic profile 1, so that only air may be suctioned out of the peripheral slot 41 via the partial vacuum impingement of the dry calibration apparatus 4. This is also true for an air intake because of the partial vacuum in the cooling tank 5, which provides advantageous conditions in regard to the mutual delimitation of the partial vacuum areas. The suction slots 42 of the dry calibration apparatus 4 upstream from the peripheral slot 41 are connected via the opening 26 in the area of the placement surface of the distributor plate 18 and the channels 20, 22, and 24 to the distributor channel 15 of the main body 13, the partial vacuum being applied via the associated supply line 17.

Figures 5, 6:
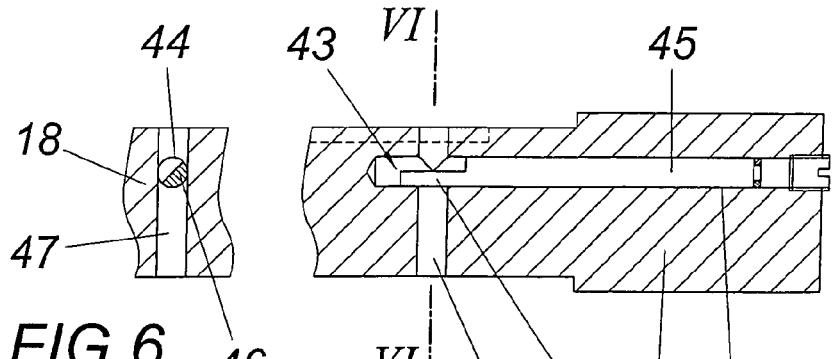
FIG. 5 shows a distributor plate in detail in the area of a control unit for the coolant liquid flow in a cross-section in a larger scale.
FIG. 6 shows a section along line VI-VI of FIG. 5.
Figure 7:
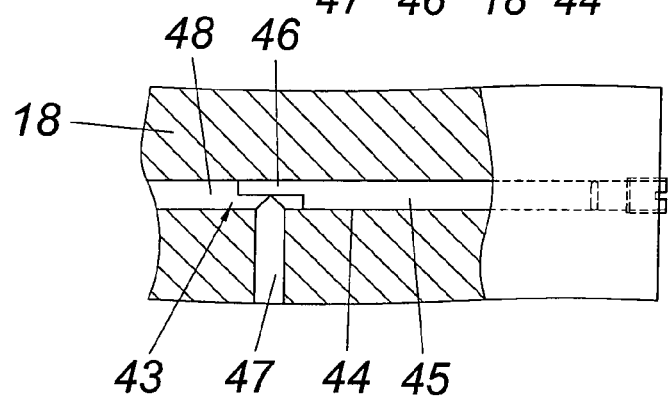
FIG. 7 shows the distributor plate in detail in a partially cut away top view in the area of an embodiment of a control unit altered in relation to FIGS. 5 and 6.

To control the coolant liquid loop to a part of a calibration unit 27, 28 for a specific cooling effect or the partial vacuum impingement of the calibration units 27, 28, for example, the carrier 12 may be provided with corresponding control units 43, which may be provided in the main body 13 and/or in the distributor plate 18, so that the flow conditions which were set once are also maintained when the dry calibration apparatus 4 is disassembled. As shown in FIGS. 5 through 7, such a control unit 43 may comprise a control bolt 45 mounted in a hole 44 so it is rotationally adjustable, which has a flattened control part 46 on one end. This control part 46 of the control bolt 45 projects into the area of a flow channel 47 intersecting the hole 44, as shown in FIGS. 5 and 6. If the control bolt 45 is rotated, the passage of the flow channel 47 is released more or less depending on the rotational position, by which the flow inside the flow channel 47 is controlled. In contrast to the embodiment in FIGS. 5 and 6, FIG. 7 shows a control unit 43 for a flow in two channel sections 47, 48 perpendicular to one another. In this embodiment as well, the flow channel 47 perpendicular to the hole 44 may be adjusted continuously between an open position and a closed position by the control part 46 of the control bolt 45

Figure 8:
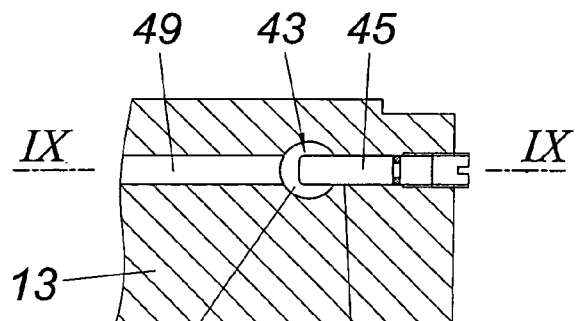
FIG. 8 shows a further constructive embodiment of a control unit in the area of the main body in an axial section.
Figure 9:
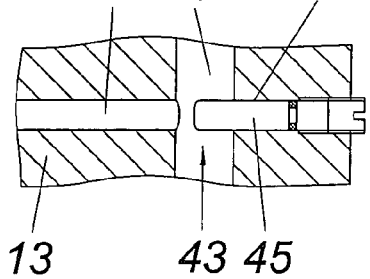
FIG. 9 shows a section along line IX-IX of FIG. 8.

The control unit 43 shown in FIGS. 8 and 9 again has a control bolt 45 mounted so it is adjustable by screwing in a hole 44, which works together with a coaxial flow channel 49 which discharges into a flow channel 50 running transversely thereto, however. The width of the throttle gap resulting between the discharge opening of the flow channel 49 and the control bolt 45 is adjusted by the axial displacement of the control bolt 45, so that the flow through the flow channel 49 may be continuously influenced via this throttle gap.

The invention claimed is:

1. A device for calibrating an extruded plastic profile having a shaping extrusion die and a framework displaceable in the longitudinal direction of the plastic profile in relation to the extrusion die, which has a cooling tank and, between the cooling tank and the extrusion die, a dry calibration apparatus, which is replaceably attached to a carrier and is connectable on one hand to supply lines for a coolant liquid feed and removal and on the other hand to a partial vacuum, wherein the carrier (12), which is adjustable in the longitudinal direction of the plastic profile (1) in relation to the cooling tank (5), forms a distributor, connected to the supply lines (16, 17), having line transitions (25) for the coolant liquid and the partial vacuum in the placement area of the dry calibration apparatus (4), which is provided with corresponding line transitions.

2. The device according to claim 1, wherein the carrier (12) has a main body (13) connectable to the supply lines (16, 17) and a replaceable distributor plate (18), which receives the dry calibration apparatus (4), forms the line transitions (25), and has a flow connection to the main body (13) via passages for the coolant liquid feed and removal as well as the partial vacuum.

3. The device according to claim 2, wherein the dry calibration apparatus (4) may be axially composed of multiple calibration units (27, 28), the main body (13) has axial distributor channels (14, 15), at least for the coolant liquid feed and the partial vacuum, which are subdivided in accordance with the axial division of the dry calibration apparatus (4) into individual calibration units (27, 28), into separate flow sections having overflow channels (30) open toward the distributor plate (18), and the distributor plate (18) forms either connection lines (31) or termini for associated overflow channels (30).

4. The device according to claim 2, wherein the distributor plate (18) has a recess (26), which extends in the axial direction over multiple suction slots (38) of the calibration units (27, 28), and is connected to a channel (24) for the partial vacuum, in the placement area of the particular calibration units (27, 28).

5. The device according to claim 1, wherein the carrier (12) has control units (43) for the coolant liquid flow and/or the partial vacuum.

6. The device according to claim 5, wherein the control unit (43) comprises a control bolt (45) inserted into a hole (44) so it is adjustable by screwing, which has a flattened part in the area of a flow channel (47) intersecting the hole (44) for the control bolt (45).

7. The device according to claim 5, wherein the control unit (43) comprises a control bolt (45), inserted into a hole (44) 50 it is adjustable by screwing, which is situated in the extension of a flow channel (49) discharging into another flow channel (50) opposite its discharge opening.

8. The device according to claim 2, wherein the distributor plate (18) has a ventilated connection (40) for a peripheral slot (41), which is provided in the area of the end of the dry calibration apparatus (4) facing toward the cooling tank (5) and is open to the plastic profile (1).

9. The device according to claim 8, wherein the dry calibration apparatus (4) is connectable to the cooling tank (5) essentially airtight.

10. The device according to claim 1, wherein the carrier (12) forms a longitudinal guide (38) for the cooling tank (5).

11. The device according to claim 10, wherein the longitudinal guide (38) is provided on the main body (13) of the carrier (12), which is lengthened beyond the distributor plate (18) toward the cooling tank (5).

12. The device according to claim 1, wherein the extrusion die (3) comprises a centering guide for the carrier (12) of the dry calibration apparatus (4).

* * * * *

UNITED STATES PATENT AND TRADEMARK OFFICE
CERTIFICATE OF CORRECTION

PATENT NO. : 7,708,539 B2  Page 1 of 1
APPLICATION NO. : 11/792660
DATED : May 4, 2010
INVENTOR(S) : Gruber et al.

It is certified that error appears in the above-identified patent and that said Letters Patent is hereby corrected as shown below:

In particular, in Column 8, line 21, (Line 2 of Claim 7) after (44) please change "50" to correctly read: --so--.

Signed and Sealed this

Third Day of August, 2010

David J. Kappos
*Director of the United States Patent and Trademark Office*